E. A. HALBLEIB.
POWER TRANSMISSION MECHANISM.
APPLICATION FILED SEPT. 17, 1913.
1,152,504.
Patented Sept. 7, 1915.
2 SHEETS—SHEET 1.
Fig. 1.
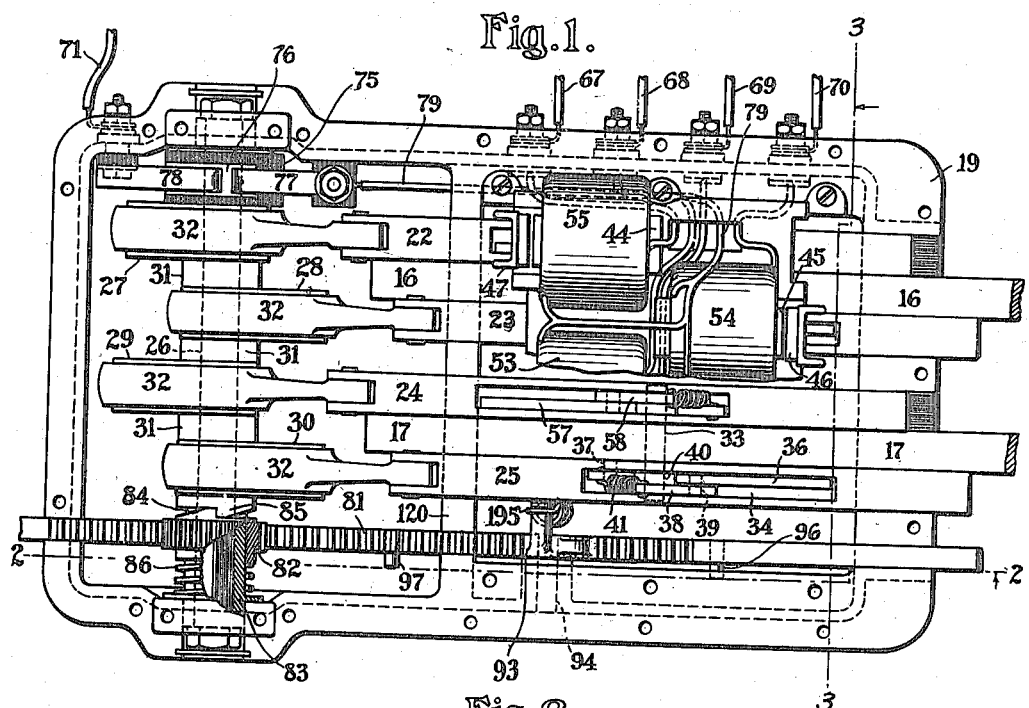
Fig. 8.
Fig. 2.
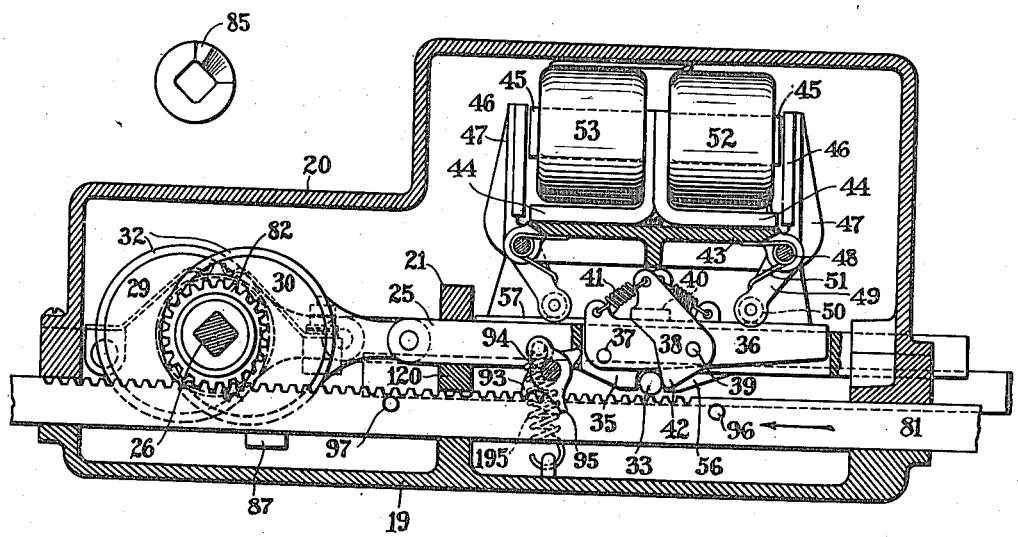
Witnesses:
Clarence W. Carroll
D. Gurnee
Inventor:
Edward A. Halbleib
by his attorneys
Davis & Dorsey E. A. HALBLEIB.
POWER TRANSMISSION MECHANISM.
APPLICATION FILED SEPT. 17, 1913.
1,152,504.
Patented Sept. 7, 1915.
2 SHEETS—SHEET 2.
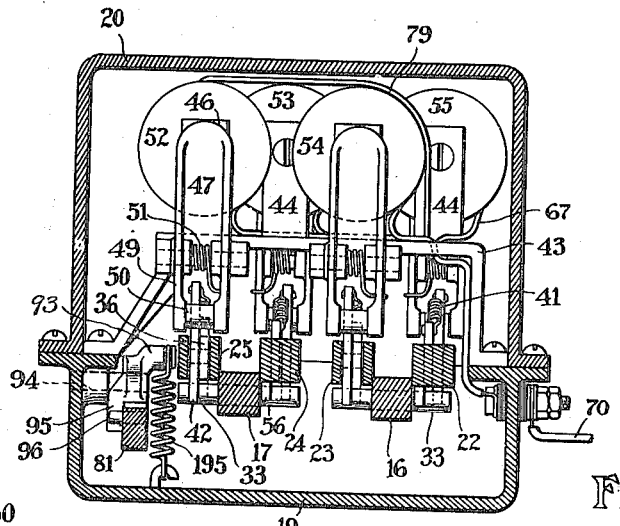
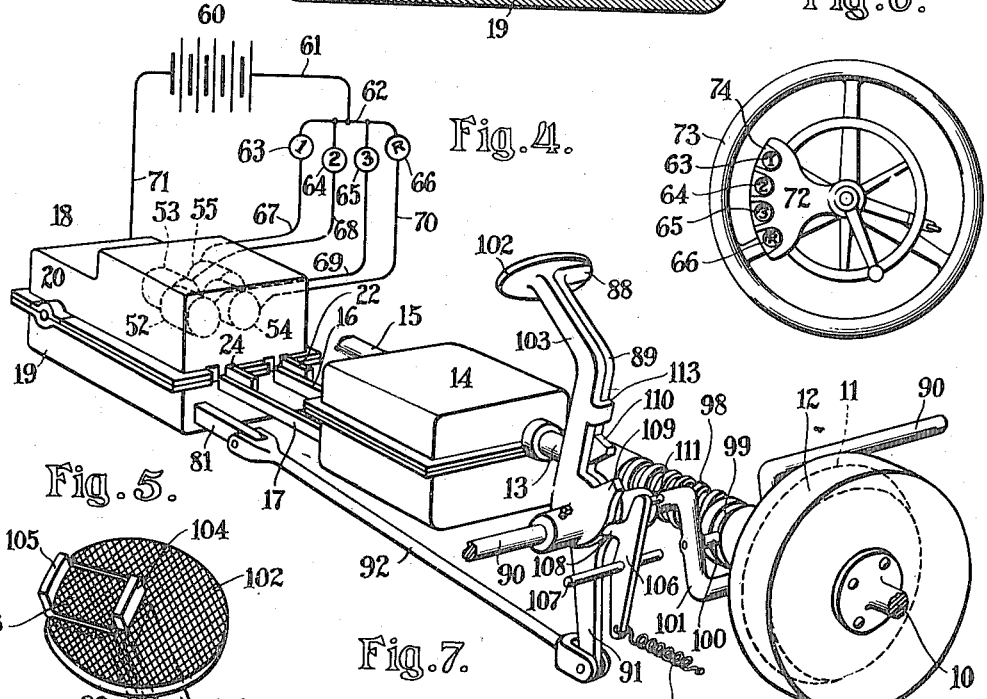
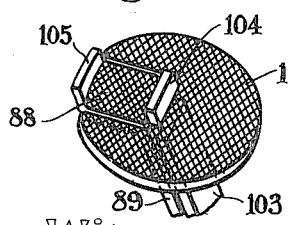
Witnesses:
Clarence W. Carroll
D. Gurnee
Inventor:
Edward A. Halbleib
by his attorneys
Davis & Dorsey

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

POWER-TRANSMISSION MECHANISM.

1,152,504.

Specification of Letters Patent.    Patented Sept. 7, 1915.

Application filed September 17, 1913. Serial No. 790,360.

*To all whom it may concern:*

Be it known that I, EDWARD A. HALBLEIB, a citizen of the United States, and resident of Rochester, in the county of Monroe and State of New York, have invented certain new and useful Improvements in Power-Transmission Mechanism, of which the following is a specification.

This invention relates to power-transmission mechanism such as is commonly employed in connection with motor-vehicles.

Mechanism of the kind in question usually comprises change-speed gearing through which an engine may be connected with the traction-wheels of the vehicle to drive them at different speed-ratios, and a clutch interposed between the gearing and the engine. Where the gearing is of the well-known sliding type the clutch must be thrown out of operation as a precedent to the operation of shifting the gear to change the driving speed, or to bring them to a neutral and inoperative position.

One object of the present invention is to facilitate the operation of shifting the gears in mechanism of the type in question, and to this end I employ novel and effective means whereby power derived either from a manually-operable member, such as a pedal, or from any convenient source, may be employed to perform selectively any one or more of the various movements involved in shifting the gearing, the selective control of this mechanism being accomplished through means, electrical or otherwise, independent of the means from which the power is derived to effect the operative movement of the gear-shifting mechanism.

Another object of the invention is to correlate the gear-shifting mechanism and the clutch-controlling mechanism in such a manner that the proper sequence is assured in the operation of these two mechanisms, while their successive operation is facilitated, by the arrangement of the pedals or other manually-operable members by which they are actuated.

The features of construction and arrangement by which the foregoing objects are carried out, together with various incidental objects and features of the invention, will be set forth hereinafter, in connection with the description of the illustrated embodiment of the invention.

In the accompanying drawings:—Figure 1 is a plan-view of a portion of a power-transmission mechanism embodying the present invention, showing particularly the mechanism by which the gear-shifting members are immediately actuated and controlled; Fig. 2 is a section on the line 2—2 in Fig. 1; Fig. 3 is a section on the line 3—3 in Fig. 1; Fig. 4 is a perspective and partly diagrammatic view of the entire mechanism, together with its electrical controlling devices; Fig. 5 is a perspective view showing, in detail, the arrangement of the pedals; Fig. 6 is a top-view showing the electrical controlling-buttons and the parts with which they are immediately associated; Fig. 7 is a side-elevation of the electric circuit-controller; and Fig. 8 is a front elevation of the one-tooth ratchet by which the rotary members of the gear-shifting mechanism are actuated.

Fig. 4 shows a general arrangement of parts which includes various elements common to transmission-mechanisms of the most common type. The power-shaft 10, which may be the crank-shaft of an engine, is connected, through the usual friction-clutch members 11 and 12, with an intermediate shaft 13, which drives a shaft 15, adapted for connection with the traction-wheels of the vehicle, through the usual gear-box 14. The construction of the change-speed gearing is not particularly illustrated, as it may be of any ordinary or well-known type, but it will be understood that the sliding gear-elements are moved to their various operative positions by means of the usual slide-rods 16 and 17, which are shown in this instance as projecting rearwardly from the gear-box in order that they may coöperate with the actuating mechanism constituting a part of the present invention. This actuating-mechanism is inclosed within a casing, and is indicated generally by the reference-number 18 in Fig. 4.

The gear-actuating mechanism is shown particularly in Figs. 1 and 2. It is inclosed within a casing having a lower body-portion 19 and a removable cover 20. The slide-rods 16 and 17, which are hereinafter at some points referred to as "gear-shifting members," slide through bearings in the right-hand wall of the casing, and are guided and supported, near their left-hand ends, by a bearing-member 120 rising from the bottom of the casing. They are confined in their bearings by engagement with the right-hand portion of the cover 20 and with a bar 21 fixed in the cover and lying across the bearing-member 120, as shown in Fig. 2. The gear-shifting rods 16 and 17 are actuated by means including four sliding rods hereinafter referred to as "actuating-members." Two of these members, 22 and 23, are located alongside the rod 16, but in a slightly higher position, while two more of the actuating-members 24 and 25, are located alongside and above the rod 17. The members 22, 23, 24 and 25 are all guided and supported in the casing in the same manner as the rods 16 and 17. The actuating-members are moved longitudinally by means of eccentric-mechanism actuated by a shaft 26 which is journaled, at its ends, in the sides of the casing 19. The main portion of the shaft is squared, as shown in Fig. 2, and four eccentrics 27, 28, 29 and 30 are mounted upon the shaft, these eccentrics having squared holes to receive the shaft and insure their rotation therewith. The eccentrics are spaced apart on the shaft by intermediate loose collars or washers 31. The several eccentrics are connected with their respective actuating-members by means of eccentric-straps 32 pivoted to these members, and the eccentrics are arranged in alternating positions upon the shaft, so that at each half-rotation of the shaft the actuating-members 22 and 23 will be caused to move longitudinally in opposite directions, and the same effect will be produced upon the actuating-members 24 and 25.

In a sliding-gear transmission mechanism of the type in which provision is made for three speeds forward and one speed in a reverse direction the sliding rods or gear-shifting members are usually arranged to have three positions each. When these members are both in their intermediate or neutral positions none of the gears or jaw-clutches of the transmission-gearing are in operation, while each of the rods has two extreme positions corresponding to one or another of the several speeds of transmission. The gear-shifting mechanism as herein described and illustrated, is adapted to actuate the rods 16 and 17 in such a manner as to provide for such three positions in each of them, this being accomplished by means of certain abutments through which the rod 16 may be connected selectively with either of the actuating-members 22 and 23, while the rod 17 may be similarly connected with either of the actuating-members 24 and 25. These abutments comprise pins 33 fixed in each of the rods and projecting from each side thereof. Each of the actuating-members is provided with a slot 34, and, in the case of the member 25, as shown in Fig. 2, a rigid downwardly-projecting lug 35 extends from the member at the farther side of this slot in such a position that it may engage the pin 33 so as to move the rod 17 from its extreme left-hand position to its intermediate position whenever the actuating-member 25 is moved from left to right. Figs. 1 and 2 show the parts at the completion of such a movement, the rod 17 being at this time in its intermediate position, corresponding to the neutral position of the gearing.

In order that the actuating-member 25 may move the rod 17, when necessary, from its intermediate position to its left-hand extreme position, a lever 36 is mounted on a pivot 37 in the slot 34, and this lever carries a dog 38 pivoted on a pin 39 projecting from the lever. The dog 38 has a lug 40 which normally engages the upper edge of the lever, and a spring 41, connecting the dog and the lever, holds the parts normally in the position shown in the drawings. The lower extremity 42 of the dog is adapted to engage the pin 33, but is somewhat inclined on each edge. In case the dog, when moving from left to right, encounters the pin 33 when the pin is stationary or is moving in the opposite direction under circumstances which will be hereinafter referred to, the dog swings about its pivot 39 and rides over the pin, through the yielding of the spring 41, but as soon as it has passed the pin the spring draws it back to its normal position as determined by the engagement of the lug 40 with the lever 36. With the pin 33 in intermediate position, as shown in Fig. 2, if the actuating-member 25 be moved to the left from the position of Fig. 2, the dog tends to move the pin 33 with it. At the same time, however, owing to the slight inclination of its left-hand surface, together with the location of the pivot 37 above the pin 33, there is also a tendency for the dog and the lever 36 to rock, as a whole, about the pivot 37, and except where means are taken to restrain this rocking movement the dog can trip idly over the pin in this direction of movement also.

To control the operation of the dog 38 I employ means, partly electrical and partly mechanical, through the operation of which the lever 36 may be held down, when necessary, to prevent it from rocking upwardly about its pivot 37. A frame-member 43 extends from side to side of the casing, across the sliding-members therein, and this frame-member carries four yokes 44 of magnetic material, provided with magnetic cores 45. A magnetic armature 46 coöperates with each of the yokes and cores, and each armature is mounted upon the upper arm 47 of a lever journaled on a pivot-pin 48 fixed on the frame-member. The lower arm 49 of each member carries a roller 50, and these parts are so arranged that one of the rollers 50 is adapted to bear against the upper edge of the lever 36, as shown in Fig. 2. A light spring 51, coiled about the pivot 48, normally holds the lever in the position of Fig. 2, with the armature 46 in proximity to the core 45 and the lever 36 in normal lower position.

Four solenoids 52, 53, 54 and 55 are mounted on the respective cores 45, and when these solenoids are energized by electric current they act to retain the armatures and the armature-levers in normal position. Assuming that it be desired to move the slide-rod 17 from the intermediate position illustrated in Figs. 1 and 2 to its extreme left-hand position, the solenoid 52 may be energized. In this case the corresponding armature, armature-lever and roller 50 are retained in normal position and the roller prevents the lever 36 from rising from normal position. Accordingly, when the actuating-member 25 is moved from right to left the dog 38 is retained in operative engagement with the pin 33, so that the pin and the rod are carried to the left with the actuating-member.

The actuating-member 24 is provided with means for operatively connecting it, through the pin 33, with the rod 17 in such a manner as to cause the rod to be moved from its intermediate position to its right-hand position. These connecting means are similar to those associated with the member 25, except that they are reversed in position. The member 24 is provided with a fixed lug or abutment 56 disposed oppositely to the lug 35, and with a dog 58 carried by a lever 57 corresponding in function, but opposite in position to the lever 36. The lever 57 is controlled by mechanism coöperating with the solenoid 53. The means for actuating the slide-rod 16 are similar to those for actuating the rod 17, the opposite movements of the rod being produced selectively by the actuating-members 22 and 23, through connecting-means controlled by the solenoids 54 and 55. Accordingly, either of the rods 16 or 17 may be moved to either of its extreme positions when the shaft 26 is rotated, according as one or another of the several solenoids is energized.

The means for selectively energizing the several solenoids are illustrated diagrammatically in Fig. 4. A battery 60, or other source of current, is connected, through wires 61 and 62, with four circuit-closers or press-buttons 63, 64, 65 and 66 which are connected, respectively, through wires 67, 68, 69 and 70, with the solenoids 55, 53, 52 and 54. The current returns from the several solenoids, through a circuit-controller hereinafter described, to a common return-wire 71 leading to the battery 60. The several press-buttons may be marked to indicate the positions of the gearing to which they correspond, such, for example, as first, second and third forward speeds, and reverse drive, and these buttons are most conveniently mounted, as shown in Fig. 6, upon a bracket 72 at the head of the steering-column, in a position in which they may be pressed by the thumb of the operator's hand when grasping the steering-wheel 73 of the vehicle in the usual manner. To prevent the operator from accidentally pressing more than one button at a time the buttons are shown as seated in sockets 74 which open in such a direction that either button may be readily depressed, while two buttons cannot be simultaneously engaged by the thumb.

As the flow of current through one or another of the solenoids is necessary and useful only during the later portion of the movement of the gear-shifting mechanism, during which one or another of the slide-rods 16 or 17 is moved from its intermediate position to one of its extreme positions, I introduce, in the electric circuit above described, a circuit-controller adapted to open the circuit except when the flow of current is necessary. This circuit-controller, as shown particularly in Figs. 1 and 8, comprises a drum 75 of insulating material mounted upon and rotatable with the shaft 26. This drum carries a contact-strip 76, which coöperates with two contact-springs 77 and 78, the spring 77 being connected with a wire 79 which branches to each of the solenoids, and the spring 78 being connected with the common return-wire 71. The contact-strip is normally out of engagement with the springs, in the position shown in Fig. 7, but near the completion of the first half of the operative movement of the shaft 26 it engages the springs as shown in Fig. 1, and thereafter it remains in engagement therewith until the second half of the rotation of the shaft has been substantially completed.

In the normal position of the parts the actuating-members 23 and 25 are in their extreme left-hand positions, and the members 22 and 24 in their extreme right-hand positions. Accordingly, all of the fixed abutments on the actuating-members are in positions remote from those corresponding to the intermediate positions of the pins 33 and the slide-rods. When a complete rotation is imparted to the shaft 26 the first half of this rotation causes the position of all of the actuating-members to be reversed, and during this movement all of the fixed abutments thereon move to positions corresponding to the positions of the abutments 35 and 56 in Fig. 2. Accordingly, either of the slide-rods which is in an extreme position is drawn positively to an intermediate position, so that a neutral position of the change-speed gearing always results from this first half-rotation. Provided none of the solenoids is energized, the succeeding half-rotation of the shaft, which causes an opposite movement in all of the actuating-members, has no effect upon the slide-rods since the dogs ride freely over them against the slight resistance offered by the springs 51, the armature being free at this time to move away from the cores 45. Accordingly, if none of the electric buttons is pressed an operative movement of the gear-shifting mechanism results in the neutral position of the gearing. If any other position of the gearing is desired, however, it is necessary only to press the corresponding button while operating the gear-shifting mechanism, and in this case the last half of the rotation of the shaft 26 results, through the action of one or another of the dogs, in a movement of one of the slide-rods from intermediate position to one or another of its extreme positions.

To rotate the shaft 26 for the purpose above set forth a slide-rod 81 is mounted in the casing 19, and is provided with rack-teeth which engage a pinion 82. The hub of this pinion is mounted to rotate freely and slide upon a sleeve 83 mounted upon the squared portion of the shaft. A single ratchet-tooth 84 on the inner face of the pinion coöperates with a single tooth on a ratchet-device 85 rotatably fixed upon the shaft 26. A spring 86 normally presses the pinion inwardly on the shaft, so as to maintain the ratchet-teeth in coöperative relation. When the slide-rod 81 is moved from its normal right-hand position, in the direction of the arrow in Fig. 2, the complete movement of the slide-rod to its extreme left hand position causes a complete rotation of the pinion and the shaft 26. When the slide-rod 81 returns to its normal position the beveled ratchet-teeth ride over each other, the spring 86 yielding and the pinion sliding axially upon the sleeve 83. The use of the single-tooth ratchet, or some equivalent device, is important since it prevents the mechanism, when carelessly operated, from initiating a movement of the shaft 26 except when it is in its normal position, thus insuring the proper operation of the mechanism and the completion of one rotative movement before another can be performed. The sliding movements of the rod 81 are limited by a stop 87 on the rod, which coöperates alternatively with the bearing-member 120 and the left-hand wall of the casing 19. The slide-rod 81 may be actuated by various means, but I have illustrated it as actuated by means of a manually-operable device in the form of a pedal 88 (Fig. 4). This pedal has a lever with upper and lower arms 89 and 91, the lever being loosely mounted on a transverse shaft 90. The lower arm 91 is connected with the slide-rod 81 by a rod 92. Accordingly, an operative movement of the gear-shifting mechanism may be produced by depressing the pedal 88.

In case the operator carelessly fails to complete the operative movement of the pedal 88 and the gear-shifting mechanism, it is important that a visible indication of this fact be afforded, and that a completion of the operation be insured before any further operation occurs in the mechanism. Accordingly, I employ means for preventing the return movement of the rod 81 until its operative movement has been completed. A detent 93 is pivoted, on a pin 94 in the casing 19, in position to coöperate with the rack-teeth on the rod 81. A spring 95 is connected, at one end, with the casing, and, at the other end, with the detent, its point of connection with the latter being so located that a slight movement of the detent beyond the point of disengagement from the rack-teeth will change the tension of the spring from one side to the other of the pivot-pin 94, thus causing its direction of action upon the detent to be reversed. In the normal position of the detent, as shown in Fig. 2, it acts to arrest return movement of the rod 81 from any intermediate position, but when the rod has substantially completed its left-hand operative movement a pin 96 on the rod engages a trip-lug 95 projecting downwardly from the detent, and swings the detent out of engagement with the rack-teeth and into its right-hand position, in which the spring 95 holds it out of operation. The rod 81 may then return freely to normal position, but just before it reaches such position a second pin 97 on the rod engages the trip-lug and rocks the detent back to normal operative position.

The clutch-members 11 and 12 are normally maintained in engagement, in the usual manner, by means of a spring 98 coiled about the shaft 13 and tending to force the member 12 toward the member 11. The clutch is disengaged also in the usual manner, through the action of a grooved collar 99 on the clutch-member 12, this collar being engaged by pins 100 on a cranked portion 101 of the shaft 90. This shaft is journaled in any convenient manner (not shown), and is provided with a clutch-pedal 102 having an arm 103 fixed to the shaft 90. Accordingly, when the clutch-pedal is depressed the shaft is rocked and the clutch released.

It is important that the operator release the driving-clutch before any attempt is made to shift the gearing by means of the pedal 88. To insure this sequence of operations in a simple manner the two pedals are arranged as shown particularly in Fig. 5. The clutch-pedal 102 is recessed at the left, and the pedal 88 is located within the recess so as to be embraced on three sides by the clutch-pedal. Accordingly, when the clutch-pedal is in normal position the gear-shifting pedal is practically inaccessible for operation by foot-pressure. Whenever the clutch-pedal has been depressed out of the plane of the gear-shifting pedal, however, the latter may be freely operated.

Owing to the successive operation of the pedals as just described, and in order to permit them to be both operated if desired by the use of one foot, a detent 106 is arranged to lock the clutch-pedal in depressed position and hold it there during the succeeding actuation of the gear-shifting pedal. This detent is mounted in a pivot 107, and provided with a shoulder 108 which coöperates with a lug 109 on the arm of the clutch-pedal. After the gears have been shifted, however, it is necessary that the clutch-pedal be released so that the clutch may be allowed to resume its functions, and accordingly the detent 106 is provided with a pin 111 which is engaged by a trip 110 on the lever-arm 89 near the end of the operative movement of the latter, which moves the detent to inoperative position, against the force of a spring 112 which tends normally to throw it into operative position. After the detent has been so tripped both pedals may be permitted to return together to normal position. To avoid the necessity of a separate spring for returning the slide-rod 81 and the pedal 88 to normal position a lug 113 on the clutch-pedal is arranged to engage the rear surface of the lever-arm 89, so as to cause the latter to move rearwardly when the clutch-pedal is moved rearwardly through the action of the spring 98 by which the clutch is normally held in operation.

A valuable feature of the construction above described resides in the fact that the eccentric-mechanism which moves the several actuating-members imparts gradually accelerated and retarded movements to these members, so as to produce the required effect with the minimum of effort on the part of the operator and without noise or strain in the mechanism. Another valuable feature of this arrangement resides in the fact that since the actuating-members are provided with positive and normally-operative means for throwing the gear-shifting members or slide-rods into their intermediate positions, every operation of the mechanism results inevitably in first bringing the gearing to neutral position. Accordingly, in case of any failure in the electrical selective means to operate, this failure will not prevent the gearing from being brought to neutral position, but can have no effect other than to prevent it from being shifted to some other position, and accordingly it is always possible to disconnect the engine from the traction-wheels of the vehicle in the usual manner.

The operation of the apparatus as a whole is as follows: Supposing the engine to be running and the gearing to be in neutral position, if it be desired to start the vehicle the operator will depress the clutch-pedal until it is caught by the detent. He will then press the button marked "1," and at the same time depress the gear-shifting pedal to the full extent of its forward stroke. The first part of this latter movement is idle in so far as the gear-shifting mechanism is concerned, but during the later part of the movement the actuating-member 22, in consequence of its right-hand movement and of the energization of the solenoid 55, causes a right-hand movement in the slide-rod 16, thus shifting the gears to what is commonly designated as the first speed. When the gear-shifting pedal has thus been fully depressed the clutch-pedal is released, and both pedals return together as the operator releases the foot-pressure against them. Any further changes required in the position of the gearing are made in the same manner. In case the operator desires at any time to release the driving-clutch without shifting the gearing, this may be done by depressing the clutch-pedal so far as may be necessary but without moving it far enough to permit the detent to catch it. The resistance of the detent, in yielding to the inclined forward surface of the lug 109 on the clutch-arm 103, tends to prevent the operator from inadvertently moving the pedal too far at this time.

While I have shown and described the gearing as arranged particularly for use in connection with a three-speed and reverse gearing, having two slide-rods each adapted to assume three positions, it will be evident that the same mechanism may be readily adapted for use with any of the well-known sliding gearings, with any required number of slide-rods and that the operation will be substantially the same where it is required to move any one of the slide-rods to only two positions instead of three positions, as is the case with some well-known forms of gearing. All such modifications may be made by merely varying the number of eccentric-mechanisms and actuating-members to coöperate with the slide-rods by which the gearing is controlled, and providing a corresponding number of electric circuit-closers or buttons.

While I have illustrated electrical devices as part of the means for selectively controlling the operation of the gear-shifting mechanism, it is not essential that such devices be employed, as equivalent mechanical devices may readily be devised; and, in general, the invention is not limited to the embodiment thereof hereinbefore described and illustrated in the accompanying drawings, but may be embodied in various other forms within the nature of the invention as it is defined in the following claims.

I claim:—

1. Power-transmission mechanism having, in combination, a gear-shifting member movable in opposite directions; an actuating-member; means for moving the actuating-member first in one direction and then in the opposite direction; normally operative means whereby the first movement of the actuating-member may be communicated to the gear-shifting member; normally inoperative means for communicating the second movement of the actuating-member to the gear-shifting member; and means, operable under the control of the operator, for holding said normally inoperative means in operative position.

2. Power-transmission mechanism having, in combination, a gear-shifting member movable in opposite directions; an actuating-member; means for moving the actuating-member first in one direction and then in the opposite direction; normally operative means whereby the first movement of the actuating-member may be communicated to the gear-shifting member; normally inoperative means for communicating the second movement of the actuating-member to the gear-shifting member; and magnetically-controlled means for holding said normally inoperative means in operative position.

3. Power-transmission mechanism having, in combination, a gear-shifting member movable in opposite directions; an actuating-member; means for moving the actuating-member first in one direction and then in the opposite direction, with a gradually accelerated and retarded movement; normally operative means whereby the first movement of the actuating-member may be communicated to the gear-shifting member; normally inoperative means for communicating the second movement of the actuating-member to the gear-shifting member; and means, operable under the control of the operator, for holding said normally inoperative means in operative position.

4. Power-transmission mechanism having, in combination, a gear-shifting member movable in opposite directions; an actuating-member located alongside the gear-shifting member; means for moving the actuating-member first in one direction and then in the opposite direction; abutments on the two members whereby the actuating-member may move the gear-shifting member in either direction, those of said abutments for movement in one direction being fixed and constantly operable, while one of the abutments for movement in the opposite direction is normally yieldable; and means, operable under the control of the operator, for holding said yieldable abutment in operative position.

5. Power-transmission mechanism having, in combination, a gear-shifting member movable in opposite directions; an actuating-member movably mounted alongside the gear-shifting member; an eccentric rotatable member; a link connecting the rotatable member with the actuating-member; a manually-operable member; connections between the manually-operable member and the rotatable member whereby a complete stroke of the manually-operable member, in one direction, may cause a complete rotation of the rotatable member, so as to produce a movement of the actuating-member first in one direction and then in the opposite direction; and means, operable under the control of the operator, whereby the actuating-member may be connected with, or disconnected from, the gear-shifting member so as to move the latter to, and leave it in, either of a plurality of positions.

6. Power-transmission mechanism having, in combination, a gear-shifting member movable, in opposite directions, to different positions; an actuating-member movable in opposite directions; means, operable under the control of the operator, for connecting the actuating-member with the gear-shifting member to cause the latter to be moved selectively to one or another of its positions; a manually-operable member; connections between the manually-operable member and the actuating-member whereby the latter is caused to move first in one direction and then in the opposite direction, at each complete operative stroke of the manually-operable member; and means for preventing return movement of the manually-operable member after its operative stroke has been partly performed and until said stroke has been completed.

7. Power-transmission mechanism having, in combination, a gear-shifting member movable in opposite directions to different positions; an actuating-member movable in opposite directions; manually-controlled means for connecting the actuating-member with the gear-shifting member to cause the latter to be moved selectively to one or another of its positions; a manually-operable member; and connections between the manually-operable member and the actuating-member whereby the latter is caused to move first in one direction and then in the opposite direction, at each complete operative stroke of the manually-operable member, said connections being operable to transmit movement from the manually-operable member to the actuating-member only when the manually-operable member is moved in one direction and to initiate a forward movement of the actuating-member only after it has returned completely to normal position.

8. Power-transmission mechanism having, in combination, a gear-shifting member movable in opposite directions and having an intermediate or neutral position and two operative positions; two actuating-members located alongside the gear-shifting member and movable in opposite directions; means for moving each of the actuating-members, first in one direction and then in the opposite direction, said means being arranged to move the two actuating-members simultaneously in opposite directions; abutments on the actuating-members and the gear-shifting member arranged to cause the latter to be moved from either of its extreme operative positions to its intermediate position by one or the other of the actuating-members during the first part of the movement of the actuating-members; and means, selectively controlled, for connecting one or the other of the actuating-members with the gear-shifting member to cause the latter to be moved from intermediate position to one or the other of its extreme operative positions during the latter part of the movement of the actuating-members.

9. Power-transmission mechanism having, in combination, a sliding gear-shifting member; a sliding actuating-member movable alongside the gear-shifting member; means for connecting the actuating-member with the gear-shifting member to move the latter in each direction of movement of the actuating-member, the connecting-means being manually-controllable with respect to their operation in at least one direction; means for moving the actuating-member, said means including a rotatable eccentric member and being operable, at each complete rotation of the latter, to move the actuating-member first in one direction and then in the opposite direction; a manually-operable member; and connections between the latter member and the rotatable member for rotating the rotatable member once for each complete operative movement of the manually-operable member, said connections including a one-tooth ratchet device; and means for preventing a return movement in said connections until the completion of an operative movement thereof.

10. Power-transmission mechanism having, in combination with change-speed gearing and a driving-clutch through which the gearing is actuated; a gear-shifting pedal connected with the gearing to control its operation; and a clutch-pedal for throwing the driving-clutch out of operation, the clutch-pedal being located alongside the gear-shifting pedal and recessed at one side to receive and partly embrace the latter, so that the gear-shifting pedal cannot be operated while the clutch-pedal remains in normal position.

11. Power-transmission mechanism having, in combination with change-speed gearing and a driving-clutch through which the gearing is actuated; a gear-shifting pedal connected with the gearing to control its operation; a clutch-pedal for throwing the driving-clutch out of operation, the clutch-pedal being located alongside the gear-shifting pedal and recessed at one side to receive and partly embrace the latter, so that the gear-shifting pedal cannot be operated while the clutch-pedal remains in normal position; and means, controlled by the gear-shifting pedal, for retaining the clutch-pedal in depressed position, said means being operable to release the clutch-pedal by depression of the gear-shifting pedal.

12. Power-transmission mechanism having, in combination with change-speed gearing and a driving-clutch through which the gearing is actuated; a manually-operable gear-shifting member; a manually-operable clutch-releasing member; a latch for retaining the latter at the end of its operative movement; and coöperative members on the latch and the gear-shifting member whereby the latch is tripped at the completion of an operative movement of the latter.

EDWARD A. HALBLEIB.

Witnesses:
D. GURNEE,
L. THON.